(12) United States Patent
Westbrock, Jr. et al.

(10) Patent No.: US 7,453,267 B2
(45) Date of Patent: Nov. 18, 2008

(54) BRANCH CIRCUIT MONITOR SYSTEM

(75) Inventors: William B. Westbrock, Jr., San Rafael, CA (US); Hugh Lindsay, Sooke (CA); Peter C. Cowan, Victoria (CA); Martin A. Hancock, Victoria (CA); Michael James Gillis, Mill Bay (CA)

(73) Assignee: Power Measurement Ltd., Saanichton, BC (CA)

( * ) Notice: Subject to any disclaimer, the term of this patent is extended or adjusted under 35 U.S.C. 154(b) by 0 days.

(21) Appl. No.: 11/333,422

(22) Filed: Jan. 17, 2006

(65) Prior Publication Data

US 2006/0238932 A1    Oct. 26, 2006

Related U.S. Application Data

(60) Provisional application No. 60/643,870, filed on Jan. 14, 2005.

(51) Int. Cl.
*G01R 31/08* (2006.01)
(52) U.S. Cl. .................................. 324/522; 324/142
(58) Field of Classification Search ................ 324/142, 324/522; 702/60, 122
See application file for complete search history.

(56) References Cited

U.S. PATENT DOCUMENTS

| | | | | |
|---|---|---|---|---|
| 3,789,268 | A | * | 1/1974 | Klein ........................... 361/45 |
| 4,322,766 | A | | 3/1982 | Becker et al. |
| 4,335,437 | A | | 6/1982 | Wilson et al. |
| 4,384,251 | A | | 5/1983 | Schelling et al. |
| 4,409,635 | A | | 10/1983 | Kraus |
| 4,752,853 | A | | 6/1988 | Matsko et al. |
| 4,858,141 | A | | 8/1989 | Hart et al. |
| 4,904,873 | A | | 2/1990 | Kühn |
| 5,140,263 | A | | 8/1992 | Leon |
| 5,196,982 | A | | 3/1993 | Landsberg et al. |
| 5,224,054 | A | | 6/1993 | Wallis |

(Continued)

FOREIGN PATENT DOCUMENTS

DE    3712190 A1    10/1988

(Continued)

OTHER PUBLICATIONS

"Select Current Sensor Performance to Match the Application's Requirements", Frank P. Wahl, PCIM Magazine 1998.

(Continued)

*Primary Examiner*—Vincent Q Nguyen
(74) *Attorney, Agent, or Firm*—Brinks Hofer Gilson & Lione (57) ABSTRACT

A branch circuit monitoring system includes a plurality of current sensor modules that are installable in a panelboard. Each of the current sensor modules may be associated with a respective one of a plurality of branch circuits included in the panelboard. Each of the current sensor modules may include a current sensor, operating logic and a communication module. The current sensor may measure a power parameter of the respective branch circuit associated therewith. The operating logic may be coupled with the current sensor and the communication module, and may direct the overall functionality of the current sensor module. The communication module may be operable to communicate with a device external to the current sensor module.

22 Claims, 3 Drawing Sheets

U.S. PATENT DOCUMENTS

| | | | |
|---|---|---|---|
| 5,442,280 A | 8/1995 | Baudart | |
| 5,572,438 A | 11/1996 | Ehlers et al. | |
| 5,583,440 A | 12/1996 | Bisher | |
| 5,615,075 A | 3/1997 | Kim | |
| 5,767,667 A | 6/1998 | Shafie | |
| 5,796,237 A | 8/1998 | Yamakawa | |
| 5,811,965 A | 9/1998 | Gu | |
| 5,877,618 A | 3/1999 | Luebke et al. | |
| 6,006,105 A | 12/1999 | Rostoker et al. | |
| 6,018,700 A | 1/2000 | Edel | |
| 6,038,117 A | 3/2000 | Dullni et al. | |
| 6,038,516 A | 3/2000 | Alexander et al. | |
| 6,091,223 A | 7/2000 | Rogers et al. | |
| 6,097,202 A | 8/2000 | Takahashi | |
| 6,109,094 A | 8/2000 | Baranzahi et al. | |
| 6,118,270 A | 9/2000 | Singer et al. | |
| 6,211,627 B1 | 4/2001 | Callahan | |
| 6,330,516 B1 | 12/2001 | Kammeter | |
| 7,221,145 B2 | 5/2007 | Bowman et al. | |
| 2002/0104004 A1 * | 8/2002 | Couillard | 713/178 |

FOREIGN PATENT DOCUMENTS

| | | |
|---|---|---|
| DE | 3743064 | 10/1988 |
| DE | 4204515 A1 | 8/1993 |
| EP | 0288998 A2 | 11/1988 |
| GB | 2274171 A | 7/1994 |
| JP | 2237057 A | 9/1990 |
| JP | 11-17511 | 1/1999 |
| JP | 11-238448 | 8/1999 |
| JP | 11-341713 | 12/1999 |
| JP | 2000-78764 | 3/2000 |
| WO | WO 98/16839 | 4/1998 |
| WO | WO 99/46606 | 9/1999 |

OTHER PUBLICATIONS

POWERLOGIC® Power Monitoring and Control Systems, May 22, 2000.

"Single Phase Monitoring Node", C~Matic Systems Ltd.

* cited by examiner

BRANCH CIRCUIT MONITOR SYSTEM

This application claims the benefit pursuant to 35 U.S.C. §119(e) of U.S. Provisional Patent Application Ser. No. 60/643,870 filed on Jan. 14, 2005, which is herein incorporated by reference in its entirety.

FIELD OF THE INVENTION

The present invention relates generally to power systems, and more particularly to a branch circuit monitoring system for use in a power system.

BACKGROUND

In electrical systems electrical power is typically diverted from a utility source to one or more branch circuits via a panelboard. Each of the branch circuits supply power to one or more loads. Typically protective devices, such as circuit breakers, are installed at the panelboard to reduce the risk of electrical overloads and short circuits. An overload occurs when too many loads draw power from a branch circuit, or when a single load draws more than the branch circuit was designed to carry.

In typical installations there may be numerous panelboards and associated branch circuits and an electrician must be aware of the loads on each circuit to properly configure each protective device and load combination. Current transformers (CT's) can be installed and commissioned on each branch circuit at the panelboard. Installation of such CT's, can often be time consuming and cumbersome. Each of the installed CT's may operate to provide a current output signal indicative of the current flow in the respective branch circuit.

The current output signal of each CT may be provided as an input to a digital signal processor included in the panelboard. The digital signal processor may be programmed to provide metering parameters and alarms based on the received current output signals from the CT's. Panelboards that include such installed CT's often require all circuits of the panelboard to be connected to a CT system. In addition, even once the initial installation and setup is done, as users continue to add loads to the branch circuits, there exists the problem of continually overloading the branch circuits. This is because there exists little or no easy way for a typical user to locally monitor the loads on a branch circuit and determine which branch circuits can handle additional loads and which branch circuits are at or near capacity.

Thus, a need exists for a branch circuit monitor system which improves the installation and commissioning of the branch circuits, as well as providing improved local status information to the typical user.

SUMMARY

The present invention relates to systems and methods for monitoring operating conditions on an electrical distribution network. At a facility such as an office building, factory or home, electrical power is delivered from a power source to one or more electrical distribution panelboards within the facility. The panelboard, or panelboards, distribute the incoming power amongst a plurality of individual branch circuits that supply power to the various loads within the facility.

The present invention provides current sensor modules that may be mounted in the electrical panelboards for monitoring various operating conditions on the individual branch circuits fed by the panelboards. The current sensor modules include circuitry for gathering power parameters related to power flow in the respective branch circuits, and communicating power parameter data to a monitoring device or to a digital network. The current sensor modules may also be adapted to take predefined actions upon the occurrence of predefined triggering events. In addition, each of the current sensor modules may provide indication and alarming with respect to the load on the respective branch circuit.

DETAILED DESCRIPTION

Figure 1:
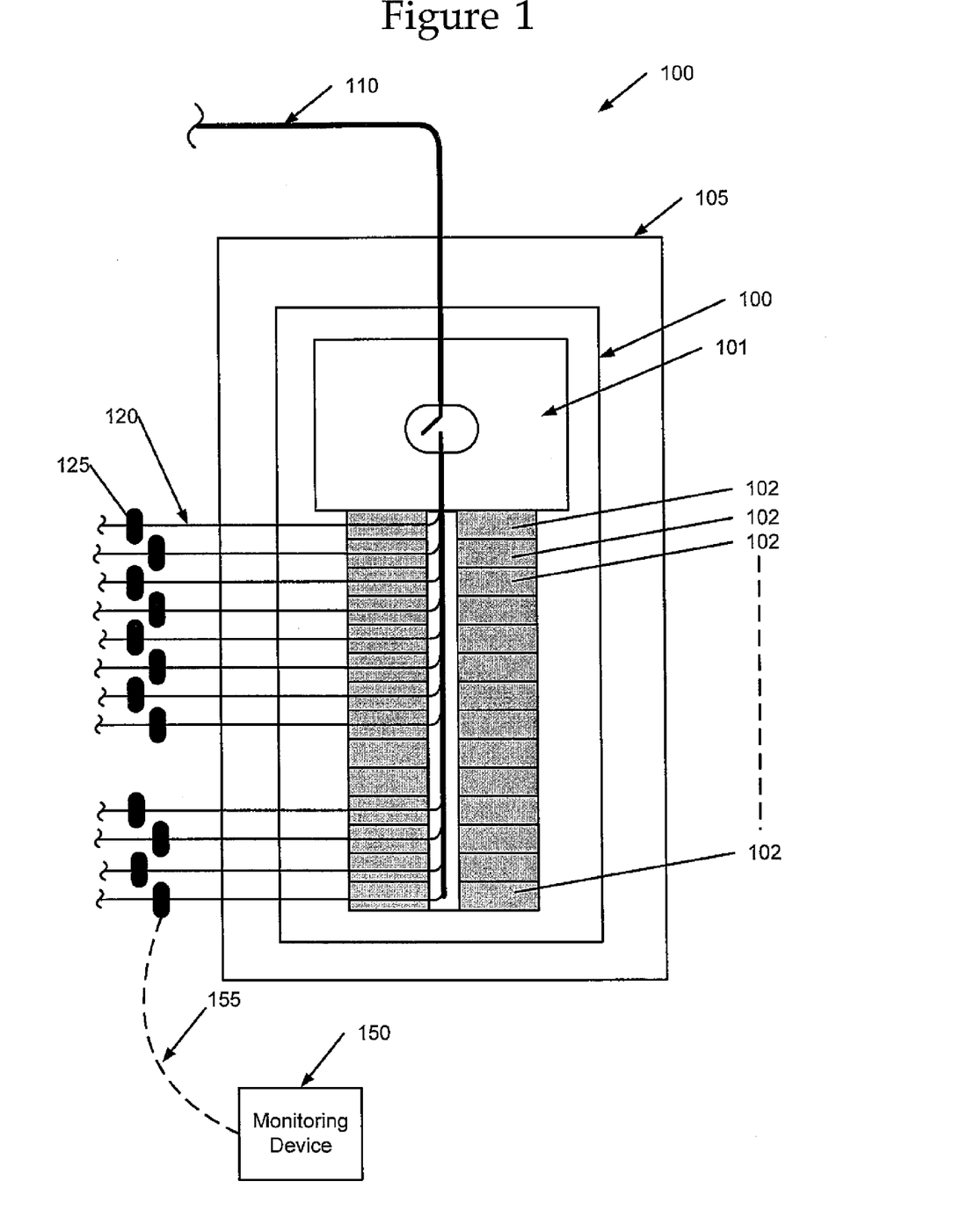
FIG. 1 illustrates an example panelboard and an example branch monitoring system that includes current sensors.

FIG. 1 shows a general overview of a branch circuit monitoring system 100. FIG. 1 also includes an example panelboard 105 with a plurality of circuits, such as sixty four circuits. In other examples, any number of circuits may be included in the panelboard 105. The panelboard 105 is fed incoming power with an incoming power line 110. The power line 110 may be an alternating current system such as a four Wire Wye system, a three Wire Delta system, a Phase-to-Phase system, a Single Phase system, or any other configuration. Alternatively, the power line 110 may be a direct current system, such as a two wire system.

Panelboard 105 includes a number of branch circuits 102. A main breaker 101 may be included that allows a user to turn off the incoming power flow to the panel board 105 if desired. The panelboard 105 is configured to distribute the incoming power to various loads connected to the individual branch circuits 102. The number of branch circuits 102 may vary depending on the number of circuits, the size of the panelboard 105, and/or the number of loads being supplied power by the panelboard 105. Some or all of the branch circuits 102 can be employed to feed loads. As use herein, the term "load" or "loads" describes one or more motors, lights, heaters, electronics, compressors, and/or any other devices that consume electric power to operate.

Each of the branch circuits 102 used to feed the loads can include a protective device such as a circuit breaker, a fuse, an actuatable switch or any other mechanism capable of interrupting power to a load when one or more predetermined conditions occur. Branch circuit lines 120 may be coupled with the protective devices and deliver power from the panelboard 105 to a load(s) coupled to a respective one of the branch circuit lines 120.

The branch circuit monitoring system 100 includes one or more current sensor modules 125 that can be employed on one or more respective branch circuit lines 120. The current sensor modules 125 are operable to sense and measure power parameters, such as current, drawn by the load connected to the branch circuit line 120. As used herein, the term "power parameter" refers to voltage, current, frequency, watts, vars, phase, and/or any other measurable or determinable variable associate with supplying power to a load.

Each of the current sensor modules 125 may include a current sensor, such as a current transformer (CT), or any other device capable of measuring power parameters, such as the current flow, present in a respective branch circuit line 120. Types of current sensors include a wound type, split core and non split core, insulation displacement, a bar type, a bushing type, a window type, a Rogoski coil type or a Hall effect type. The current sensor may include a primary winding for measuring the primary current flowing in the branch circuits 102, and a secondary winding for outputting a secondary current that is proportional, and at a relationship, to the primary current.

The branch circuit monitoring system 100 may further include one or more monitoring devices 150. The monitoring device 150 may be any form of device(s), such as an Intelligent Electronic Device (IED) that is capable of receiving signals indicative of one or more power parameters from the current sensor modules 125, processing the power parameters, and providing related information. One or more current sensor modules 125 may be coupled to the monitoring device 150. Herein, the phrase "coupled with" or "coupled to" is defined to mean directly connected to or indirectly connected through one or more intermediate components. Such intermediate components may include both hardware and software based components.

The current sensor modules 125 may communicate with the monitoring device 150 over a communication link 155. The communication link 155 may be any form of wireless or wireline communication pathway between one or more devices. The monitoring device 150 may receive signals representative of data, such as power parameters from the current sensor modules 125. In addition, the monitoring device 150 may be capable of performing one or more functions such as recording events, initiating alarms, and the like based on data received from the current sensor module(s) 125 and or determined by the monitoring device 150.

The monitoring device 150 may determine additional power parameters as a function of the received signals, and/or any other parameters associated with the load(s), the power source, etc. The monitoring device 150 may also be configured to communicate data received from the current sensor modules 125 and/or any other received or determined power parameters to other devices. In addition, the monitoring device 150 may communicate data to the current sensor modules 125. An example monitoring device 150 is a 7600 RTU manufactured by Power Measurement Ltd., of Saanichton, BC, Canada.

The monitoring device 150 can be powered from the power supply line 110, or one or more of the branch circuit lines 120. Alternatively, the monitoring device 150 may be powered from a power supply that is powered independent of the power supply line 110 and the branch circuit lines 120. The monitoring device 150 may include internal operating logic, such as a processor, a GPS or a timesync module, digital network communications or web server capabilities, power management logic, such as power quality analysis functionality, and/or temperature, demand, kWh or current monitoring functionality.

Figure 2:
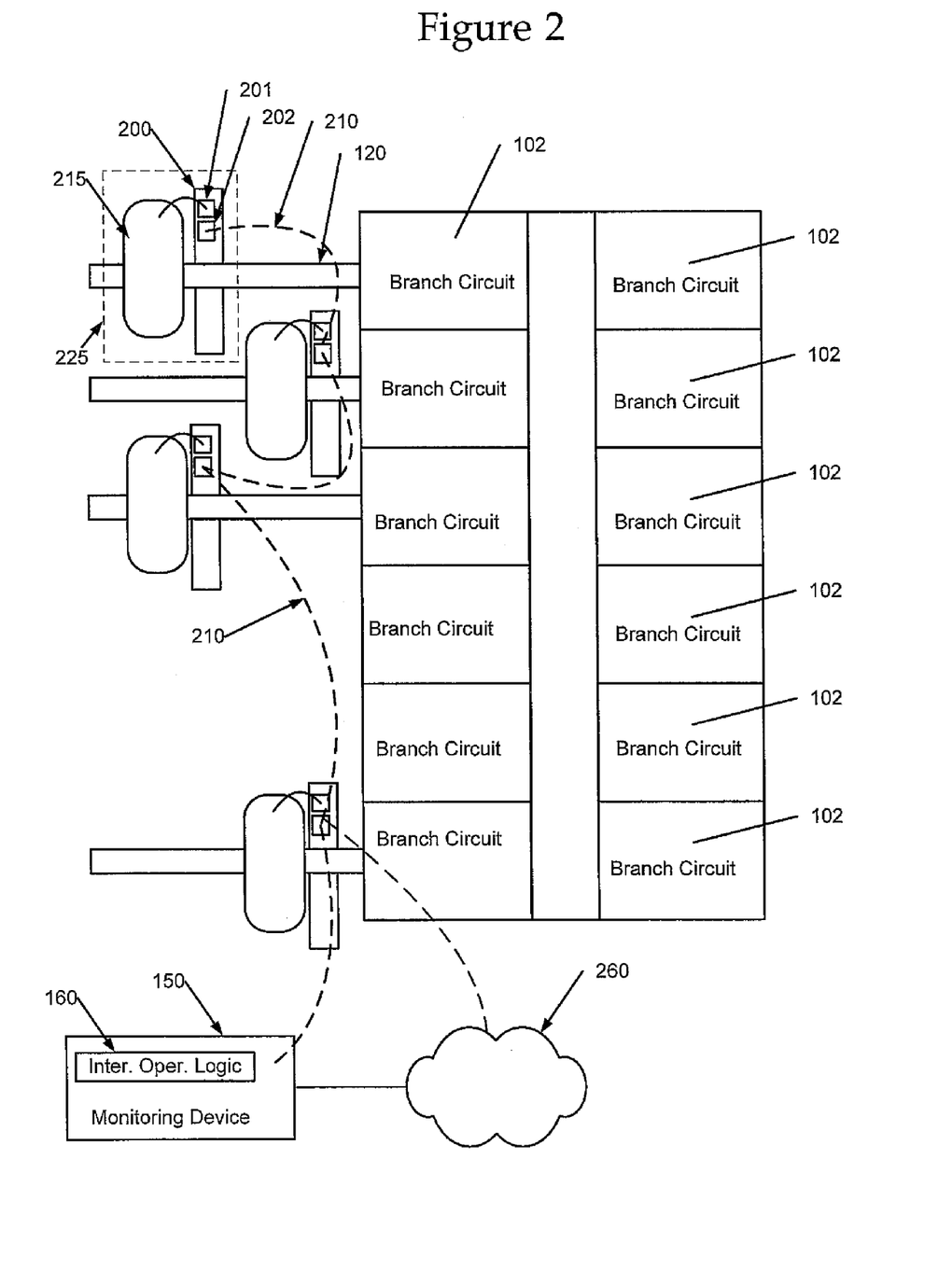
FIG. 2 illustrates another example panelboard and another example branch monitoring system that includes current sensor modules coupled with branch circuits.

FIG. 2 is a more detailed view of another example panelboard and an example branch circuit monitoring system. Current sensors 215 can be installed to sense power parameters of a plurality of respective branch circuit lines 120. The branch circuit monitoring system may be flexible in that current sensors 215 can be installed on only those branch circuit lines 120 on which monitoring is desired or necessary. For example, on some branch circuit lines 120, such as lighting circuits for example, loads may be fairly constant and transients and other anomalies may be of little consequence or interest. Such branch circuits 102 may not require monitoring. Other branch circuit lines 120, however, may feed equipment with loads that are frequently starting and stopping such that load conditions are constantly changing. On these types of branch circuits, monitoring may be desired.

In the embodiment shown in FIG. 2, the current sensors 215 may be split core CTs mounted on a base in the panelboard or on the branch circuit lines 120. Each current sensor 215 may be electrically coupled by conductors with a circuit board 200. Circuitry and an operating logic 201 may be included on the circuit board 200. The circuitry and operating logic 201 may provide input/output capability, sensed power parameter processing and enable external communication. The circuitry and operating logic 201 may include filters, analog-to-digital converters, buffers, memory, etc. as well as a processor. The processor may execute instructions to control overall operational functionality of the current sensor modules 225, as well as signal processing and communication. A communication module 202 may also be included in the current sensor modules 225. The communication module 202 may enable the current sensor 215 and or the circuitry and operating logic 201 to communicate with other devices, such as other current sensor modules, the monitoring device 150 and/or an external network 260, such as a digital network, over a communication link 210.

Collectively each current sensor 215, circuit board 200, circuitry and operating logic 201 and communication module 202 used to sense, measure and process power parameters for a respective branch circuit line 120 may form a current sensor module 225. In another example, the current sensor 215 may be mounted on a base, the current sensor 215, the base and the circuitry and operating logic 201 may be enclosed in a resin or other type of potting compound that surrounds the CT module 225. In one example, the communication module 202 may be positioned to be accessed around the resin enclosure. In another example, a wire can extend through the resin and the communication module 202 may be disposed within the resin enclosure at the end of the wire and coupled thereto.

The communication modules 202 may allow the current sensor modules 225 to communicate information, such as digital information, relating to their respective branch circuits 120 over a communication link 210. As described later, the communication modules 202 may each include selective functionality to communicate in any of a plurality of protocols. The communication link 210 may extend between individual current sensor modules 225 and between the current sensor modules 225 and the monitoring device 150. The communication link 210 may be a physical connection, such as circuit board foil, jumpers and/or cables, or a non-physical connection, such as infrared, Bluetooth, mesh or wireless configurations.

In one example embodiment, one of the current sensor modules 225 disposed in the panelboard may operate as a "master" current sensor module 225. The master current sensor module 225 may aggregate or consolidate data from the other current sensor modules 225 and communicate the data to the monitoring device 150. Alternatively each current sensor module 225 can communicate to the monitoring device 150 directly. The current sensor modules 225 may also be of mixed types and sizes, and operate at different current levels, such as, ranging from 20 Amps to 60 Amps.

In operation each of the multiple current sensor modules 225 may be coupled with a respective branch circuit 102 in a panelboard. Each current sensor module 225 may be associated with a unique identifier, such as an identification number, and may be coupled with the monitoring device 150 either directly or via another current sensor module 225. As power is applied to the panelboard and flows through the branch circuits 102 the current sensor's 215 may sense and measure the current flowing in their associated branch circuit 102 as well as any other power parameter(s). The circuitry and operating logic 201 may process the measured power parameter(s) and provide current data and/or any other power parameter related measurement data to the monitoring device 150.

The ID number may allow the monitoring device 150 to identify which branch circuit 102 and associated current sensor module 225 is associated with the transmitted data. In one embodiment the monitoring device 150 can act in response to the data, such as sending an alert if the current sensor module 225 senses an associated branch circuit 102 approaching a current overload condition, or having no load at all.

There are several other features the current sensor module 225 may include to improve functionality. The current sensor module 225 and associated features or functionality can be embedded directly into a circuit protection device, such as circuit breaker, or branch circuit 102 to form a single device. Accordingly, a physically separate current sensor 215 and circuit protection device may be unnecessary.

Each of the current sensor modules 225 may include a visual indicator that allows a user to visually observe a status of the respective branch circuit line 120. The visual indicator may be directed by the operating logic 201. In one embodiment, the visual indicator may be a plurality of light emitting devices, such as light emitting diodes ("LED's") that are located on each of the current sensor modules 225. The light emitting devices may represent utilized current capacity of a respective branch circuit line 120. For example, if five light emitting devices were disposed on a current sensor module 225 each illuminated light emitting device could indicate a 20% load factor on the branch circuit line 120, and when the fifth and final light emitting device was illuminated it could indicate a determined percent loading of a respective branch circuit line 120 had been reached. For example, a determined percent load may indicate a respective branch circuit line 120 is over 80% loaded and that a breaker trip may be imminent.

Being able to visually observe the status of each branch circuit 102 may be important for users as it allows them to quickly identify which branch circuit lines 120 are nearing capacity and which branch circuit lines 120 can receive additional loading. Alternatively, the visual indicator may include a display, such as an LCD screen. The display may be operative to display alphanumeric or graphical representations of the current characteristics, voltage characteristics, or any other power parameter related characteristics of a respective branch circuit 102.

The current sensor module 225 may also include onboard alarming. The onboard alarming may be directed by the operating logic 201 based on one or more predetermined parameters. The visual indicator may be used to be indicative of at least one predefined alarm condition of a respective branch circuit 102. As noted previously, when a branch circuit line 120 is nearing a predetermined or preset trip level it is advantageous for a user or software system to be notified of the event or impending event. Other alarming events may include a 'no load' indication or programmable level indications, such as 50% load, 85% load, etc., which may be preset warning levels as determined by a user. The onboard alarming may also be configured by a user to trigger load reductions and/or trigger any other user defined indications, alarms, actions and/or events.

The current sensor module 225 may also be configured to consolidate load measurements between branch circuit lines 120. Thus, the situation where multiple current sensor modules 225 communicate with the monitoring device 150 at substantially the same time may be eliminated. In operation, aggregation and consolidation of loads may be accomplished through a first current sensor module 225 that pushes power parameter data, such as current data, to a second current sensor module 225. The second current sensor module 225 may push both its own power parameter data and the received power parameter data to a third current sensor module 225, and so on, until the accumulated sets of power parameter data reaches a current sensor module 225 configured to transfer the data to the monitoring device 150. The sets of power parameter data can be cumulatively pushed through a plurality of current sensor module 225 at scheduled intervals, regular time intervals, or based on an event, such as an overload, a power quality event, a pre-configured current level event, a breaker trip, and/or any other power parameter related event. Alternatively, data can be pulled, or polled, from the current sensor modules 225 by the monitoring device 150 and/or other current sensor modules 225.

The monitoring device 150 can be used as a gateway to the network 260. Alternatively, one or more current sensor modules 225, such as the respective communication modules 202 may include digital or analog networking logic that enables direct communication with the network 260. The network 260 may be a digital network, an analog network, or some combination thereof. In addition, the network 260 may be a public or private intranet, an extranet, or any other network configuration that enables the transfer of data and commands, such as the Internet, a wide area network (WAN), and/or a local area network (LAN).

Network based push technology can be utilized to push the power parameter data and/or alarming notification from the current sensor modules 225 out to the network 260. The current sensor modules 225, such as the respective communication modules 202, may also enable communication of information via cellular phone or pager applications. In addition, the current sensor modules 225, such as the respective communication modules 202, may enable communication with electronic mail client applications such as applications that support SMTP, MIME or POP network communications protocols.

The current sensor modules 225, such as the respective communication modules 202 may also include data security functionality for data communicated by the current sensor modules 225. For example, transmitted data may be protected by security client applications such as encryption/decryption or authentication applications such as secure-HTTP or secure sockets layer ("SSL") that is executable by the operating logic 201 and/or the communication module 202. Additionally, or alternatively, in other examples, security of communicated data may be available via other client applications that support standard network communications protocols such as telnet, hypertext transport protocol ("HTTP"), file transfer protocol ("FTP"), network news transfer protocol ("NNTP"), instant messaging client applications, or combinations thereof. Other client application protocols that include extensible markup language ("XML") client protocol and associated protocols such as Simple Object Access Protocol ("SOAP") or RSS feeds may also be enabled with the current sensor modules 225 to securely transmit and receive data.

The current sensor module 225 may also include power management logic and functionality. Such logic and functionality may enable the current sensor modules 225, such as the operating logic 201 to execute instructions, perform logic tasks and/or provide operating codes to manage overall functionality, perform calculations and control inputs/outputs of the current sensor module 225 or respective branch circuit line 102.

The power management logic and functionality may also enable the current sensor module 225 to monitor for, perform, act on, and/or report power events indicated by the power parameters. Power event related functionality of the operating logic 201 may include a sliding window demand function, a harmonics function, a waveform capture function, a time synchronization function, a power quality analysis function, a transient detection function and a fast Fourier transform (FFT) analysis function. The sliding window demand logic function may calculate average power parameters in one or more of the branch circuit lines 120, such as the average current (I_avg) based on a measured current in one or more of the branch circuit lines 120. In addition, the sliding window demand logic function may enable storage and monitoring functions related to data logging and trending.

The harmonics function may provide harmonic detection, storage and analysis capability. The waveform capture function may enable capture of a predetermined portion of a waveform of one or more of the power parameters, such as capture of a current waveform. The time sync. function may enable the current sensor module 225 to include a time reference, such as a date and time stamp that may be associated with measured and/or determined power parameter data. The time reference may also be included with data communications, which allows the monitoring device 150, or any other device, to align samples from multiple current sensor modules 225 to create an accurate time based representation of power parameters, energy or power usage of one or more branch circuit lines 120 over a specific time period.

The power quality analysis function may include the capability to capture, analyze and/or store waveforms, thresholds, transients, or any other data related to power parameters. The transient detection function may include the capability to specify parameters and capture transient incidents that meet the specified criteria. The fast Fourier transform analysis allows application of fast Fourier transform processing to measured and/or determined data.

After installation, the current sensor module 225 may require power to operate. In one embodiment the current sensor module 225 may be powered by a power source that is an uninterruptible power source. For example, the source of uninterrupted power may be received with the communications module 202. Thus, power may be supplied to the current sensor module 225 on the communication line 210 even when the power supply line 110, and/or one or more of the branch circuit lines 120 are deenergized. Alternatively, or in addition, the current sensor module 225 may receive power from inputs and/or outputs of the circuitry and operating logic 201. In another embodiment, the current sensor module 225 may be powered with the electric field generated by a respective branch circuit line 120, with a battery or with any other power source included in the current sensor module 225. Alternatively, or in addition, an inline current sensor module 225 may be installed between the circuit protection device and the branch circuit line 120. For inline current sensor modules or insulation displacement current sensor modules 225, the power may be taken directly from the branch circuit line 120.

Once current sensor modules 225 are installed in a panelboard, the branch circuit monitor system may be set up, or commissioned. Part of the commissioning process may include establishing communication pathways between individual current sensor modules 225, between the current sensor modules 225 and the monitoring device 150, and/or directly with the network 260. The communication modules 202 may include functionality to enable communication pathways to be formed with connections such as direct hardwire connections, infrared communication connections, Bluetooth communication connections, radio frequency (RF) connections, Zigbee interfaces connections, 802.11 interface connections and/or power line carrier connections.

Alternatively, or in addition, the current sensor modules 225 may communicate among each other to form a closed mesh network. The closed mesh network may include a hierarchy mesh network or a small mesh cluster. The closed mesh network may enable wireless communication between the communications modules 202 and the monitoring device 150. Alternatively, or in addition, the closed mesh network may enable the communications modules 202 to communicate directly over a digital network.

Figure 3:
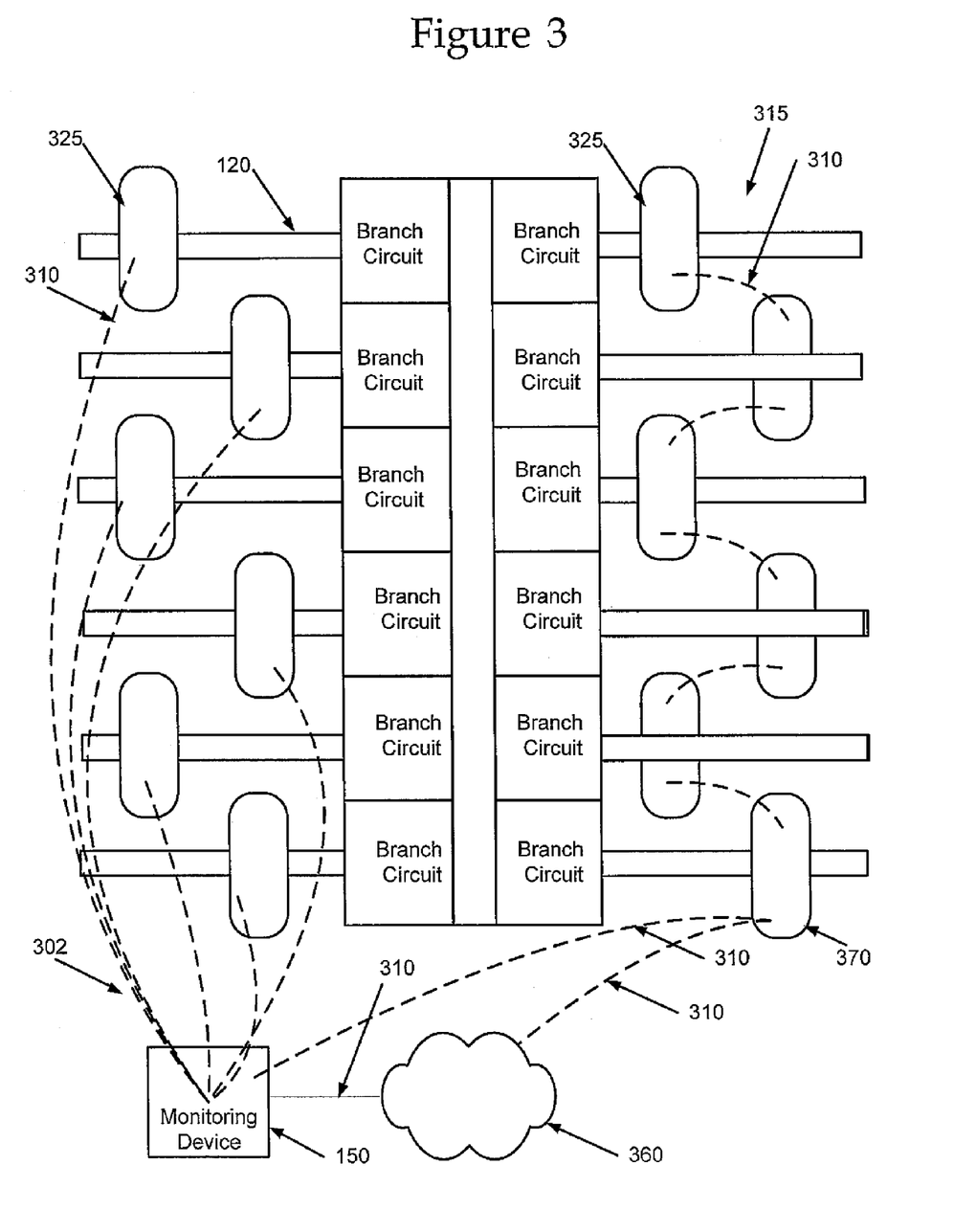
FIG. 3 illustrates yet another example panelboard and yet another example branch monitoring system that includes current sensor modules coupled with branch circuits.

FIG. 3 includes another example panelboard and another example branch circuit monitoring system. In FIG. 3, various communications configurations that may be employed are illustrated. In the examples of FIG. 3, communication links 310 are shown coupled with individual current sensor modules 325, a monitoring device 150 and a network 360.

FIG. 3 also shows an example of a plurality of individual current sensor modules 325 in a bus network 302 that is a star configuration. Thus, the current sensor modules 325 may communicate over the communication links 310 directly to the monitoring device 150. The monitoring device 150 may be directly coupled via a communication link 310 with the network 360. Accordingly, the monitoring device 150 may operate as a gateway for communication between the current sensor modules 325 and the network 360. In a gateway capacity, the monitoring device 150 may provide translation between protocols, add or remove protocols and/or act as a pass through for data communicated between the current sensor modules 325 and the network 360. In addition, FIG. 3 illustrates an example of individual current sensor modules 325 communicating directly with each other over communication links 310 to form a local communication network 315. A communication link 310 also may be present between the monitoring device 150, the local communication network 315, and the network 360.

In the local communication network 315, current sensor modules 325 may be coupled via communication links 310 with a master current sensor module 370. The master current sensor module 370 may be coupled via communication links 310 with the monitoring device 150 and/or the network 360 as illustrated. Alternatively, the current sensor modules 325 in the example local communication network 315 may each be directly coupled via a communication link 310 with the master current sensor module 370, the monitoring device 150 and/or the network 360. In another alternative, the current sensor modules 325 the monitoring device 150 and/or the network 360 may be coupled via communication links 310 with each other via a combination of a bus configuration and a star configuration.

The current sensor modules 325 and/or the monitoring device 150 may include the capability to selectively communicate in any one of multiple protocols, such as a BACnet protocol, a Profibus protocol, an IEC 870 protocol, a Lonworks protocol, a simple network management protocol (SNMP), a distributed network protocol (DNP) or Modbus protocols, such as Modbus Plus, Modbus TCP or Modbus ASCII. Selection of the protocols by the communication module 202 may be based on analysis of communication received by a respective current sensor module 325. The communication module 202 may analyze and determine the received communication and switch between the available protocols to enable communication in the detected one of the protocols. Detection of the protocol may be based on a header or other identifier included in the communication, a structure of the received data, and/or any other mechanism to differentiate the various protocols.

Automated selective choice of one or more of a plurality of protocols enables the current sensor modules 325 to be implemented within networks having more than one protocol in use without specific setup or specification being required in the current sensor modules 325 for each of the protocols being used. Thus, the current sensor modules 325 have flexible and automated configurability to operate as "plug and play" devices in different network or communication scenarios. In addition, the current sensor modules 325 may selectively use the protocols for improved communication and alarming speed since serial alarming is bounded by the limitations of multi-drop serial communications. In multi-drop serial communications, only one device can respond at a time to an alarm or event.

Referring again to FIGS. 1 and 2, the current sensor modules 225 may also communicate with power line carrier communications. The communication module 202 within the current sensor modules 225 may inject a signal into a respective branch circuit line 120. The injected signal may be transmitted over the branch circuit lines 120 and/or the power lines 110. The signal may be received by a monitoring device 150 that is coupled with a branch circuit line 120 and/or the power lines 110. The signal can be injected into the branch circuit line 120 either through a signal injection device, such as a capacitively clamped device coupled with the branch circuit line 120, an inline voltage connection, or through an insulation displacement connection. The signal injection device may be either disposed within or separated away from the current sensor modules 225.

During communications and commissioning, each of the current sensor modules 225 may include a unique identifier (ID). This unique ID may allow a user or branch circuit monitoring system to identify the branch circuit line 120 that corresponds to data. In one embodiment the monitoring device 150 may include a communications port having a plurality of port addresses. Each port address within the communications port may represent a branch circuit line 120 in a branch circuit monitoring system. The combination of the communications port and one of the port addresses may be used to form a unique ID for each respective branch circuit line 120 within the branch circuit monitoring system. For example, a communications port may be http://10.1.1.0 with port addresses from 0001 to 0065, thus the ID's for the current sensor modules 225 coupled with the communication port may be http://10.1.1.0:0001, http://10.1.1.0:0002, . . . , http://10.1.1.0:0065.

In another embodiment each current sensor module 225 comprises a Radio Frequency Identification chip ("RFID") having a unique ID that is a unique RFID number. The RFID may carry information about the current sensor module 225, such as location, CT accuracy, calibration characteristics or curves, amperage rating, alarming/setpoint information and/or configuration/setup information. Using the unique RFID number not only allows a unique ID tag to be associated with the data coming from a particular current sensor module 225, but also allows storage of information about the current sensor module 225 within the current sensor module 225 for ready access and/or retrieval.

The current sensor modules 225 can either be setup after installation, or be pre-programmed and pre-configured before installation in a build-to-order system. In the case of pre-programmed or pre-configured current sensor modules 225, the current sensor modules 225 can be set to customer requirements at the factory prior to shipment to site. Customer requirements, such as high, low and trip levels for alarming or monitoring may be set. To accommodate ease of full or partial commissioning, the current sensor modules 225 and monitoring devices 150 may include built in web-based configuration pages, such as HTML or XML driven pages. In the case of the current sensor modules 225, the operating logic 201 may direct and control the execution and functionality of the configuration pages.

A user may connect a computer, such as a laptop or palm-pilot, through an uninterrupted power transfer (UPT) system. Access from the UPT to configuration pages included in the monitoring device 150 or current sensor module 225 may be enabled with a pre-configured unique ID associated with the monitoring device 150 or current sensor module 225 with which communication is desired. In addition, or alternatively to a UPT system, communication may be enabled with Bluetooth, Zigbee, 802.11, an IEC protocol or any other wireless or mesh networking communications.

Once a web-based connection is established, a menu-driven configuration of the current sensor modules 225 associated with a panelboard can be completed. The menu-driven configuration may include the capability for a user to set configuration information, such as CT ratios, low/high/trip levels, alarm response contacts and any other configurable variables of the current sensor modules 225. Further, the on-board web configuration may be utilized to view registers included in the current sensor modules 225. One type of custom configuration may be alarm setpoints or other configurations done either relative or absolute to the panelboard or specific branch circuit line 120. This would allow a user to setup mixed circuit protection device applications within a power distribution unit or panelboard.

Alternatively, or additionally, a configuration file may be sent or uploaded to the current sensor modules 225 and implemented with the operating logic 201. In another alternative, or addition, a monitoring device 150 may include a configuration file that is distributed to the associated current sensor modules 225. A current configuration file may also be requested and downloaded from a current sensor module 225 in order to archive the current settings and/or data related to the current sensor module 225 in the event of a device failure or replacement.

The ability to change the configuration of the current sensor modules 225, either the setpoints or the actual CT ratios, is also possible. Accordingly, security measures may be provided within the operating logic 201 to prevent unauthorized access and tampering. Through web-based configuration pages password control or other security access may be implemented to prevent unauthorized access. The security provisions may also have separate security access levels that are configurable for various functions such as altering setpoints, trip levels or alarming functions. The security measures may also provide for passwords that allow access to functions of a current sensor module 225 or monitoring device 150 only during specified time periods. This allows, for instance, a worker to alter a circuit protection device for load shedding only during certain times of the day, such as during non-critical load times on that circuit protection device.

While various embodiments of the invention have been described, it will be apparent to those of ordinary skill in the art that many more embodiments and implementations are possible within the scope of the invention. Accordingly, the invention is not to be restricted except in light of the attached claim and its equivalents.

We claim:

1. A branch circuit monitoring system comprising:
a first current sensor module comprising:
a first current sensor operative to measure at least one power parameter of a first branch circuit line;
a first operating logic coupled with said first current sensor; and a first communication module operative to establish communications with an external device, said first communication module coupled with said first operating logic; and a second current sensor module comprising:

a second current sensor operative to measure at least one power parameter of a second branch circuit line;

a second operating logic coupled with said second current sensor; and a second communication module coupled with said second operating logic, wherein said external device comprises a digital network, wherein said first operating logic includes digital networking logic operative to enable direct communication between said first current sensor module and said second current sensor module and between said first current sensor module and said digital network, wherein said digital network is at least one of an Internet, a wide area network, or a local area network, or combinations thereof.

2. The branch circuit monitoring system of claim 1 wherein said first communication module is operative to enable electronic mail client communication.

3. The branch circuit monitoring system of claim 1 wherein said external device comprises a third current sensor module, an external monitoring device, an external digital network, or a combination thereof.

4. The branch circuit monitoring system of claim 1 wherein said first communication module is operative to enable communication with at least one of cellular phone communication, pager communication, or a combination thereof.

5. The branch circuit monitoring system of claim 4 wherein said second communication module is operative to enable communication with at least one of cellular phone communication, pager communication, or a combination thereof.

6. The branch circuit monitoring system of claim 1 wherein said first communication module is operative to enable electronic mail applications that include SMTP, MIME, and POP network communication protocols, or a combination thereof.

7. The branch circuit monitoring system of claim 6 wherein said second communication module is operative to enable electronic mail applications that include SMTP, MIME, and POP network communication protocols, or a combination thereof.

8. The branch circuit monitoring system of claim 1 wherein said first operating logic is operative to generate a web-based configuration page, said web-based configuration page operable to enable menu-driven configuration of said first current sensor module and said second current sensor module.

9. The branch circuit monitoring system of claim 8 wherein said second operating logic is operative to generate a web-based configuration page, said web-based configuration page operable to enable menu-driven configuration of said first current sensor module and said second current sensor module.

10. The branch circuit monitoring system of claim 1 wherein said first operating logic includes power management logic functions comprising at least one of a sliding window demand function, a harmonics function, a waveform capture function, a time synchronization function, a power quality analysis function, a transient detection function or a fast Fourier transform analysis function, or a combination thereof.

11. The branch circuit monitoring system of claim 10 wherein said time synchronization function is operative to include a time reference in data communicated from each of said first current sensor module and said second current sensor module.

12. The branch circuit monitoring system of claim 1 wherein said first communication module includes a security client application operative to provide a secure communication link with said external device.

13. The branch circuit monitoring system of claim 1 wherein said first current sensor, said first operating logic and said first communication module are embedded in one of a circuit breaker or said first branch circuit line.

14. The branch circuit monitoring system of claim 1 wherein said second communication module is operative to establish communications with said external device.

15. The branch circuit monitoring system of claim 14, wherein said second operating logic includes digital networking logic operative to enable direct communication between said second current sensor module and said digital network.

16. The branch circuit monitoring system of claim 14 wherein said second communication module includes a security client application operative to provide a secure communication link with said external device.

17. The branch circuit monitoring system of claim 1 wherein the first communication module and the second communication module are each operative to communicate digital information.

18. A branch circuit monitoring system comprising:

a first current sensor module comprising:

a first current sensor operative to measure at least one power parameter of a first branch circuit line;

a first operating logic coupled with said first current sensor; and a first communication module operative to establish communications with an external device, said first communication module coupled with said first operating logic; and a second current sensor module comprising:

a second current sensor operative to measure at least one power parameter of a second branch circuit line;

a second operating logic coupled with said second current sensor; and a second communication module coupled with said second operating logic, wherein said first communication module and said second communication module are operative with selective functionality to communicate in a plurality of protocols, comprising at least two of a BACnet protocol, a Profibus protocol, an IEC 870 protocol, a Lonworks protocol, a simple network management protocol, a distributed network protocol, or a Modbus protocol, or a combination thereof.

19. The branch circuit monitoring system of claim 18, wherein said selective functionality is operable to detect incoming communication that is one of said protocols and switch between said protocols to communication in said detected one of said protocols.

20. A branch circuit monitoring system comprising:

a first current sensor module comprising:

a first current sensor operative to measure at least one power parameter of a first branch circuit line;

a first operating logic coupled with said first current sensor; and a first communication module operative to establish communications with an external device, said first communication module coupled with said first operating logic; and a second current sensor module comprising:

a second current sensor operative to measure at least one power parameter of a second branch circuit line;

a second operating logic coupled with said second current sensor; and a second communication module coupled with said second operating logic, wherein said first communication module and said second communication module comprise a communication link that is formed with one of an infrared connection, a Bluetooth connection, a radio frequency connection, a Zigbee interface connection, or an 802.11 interface connection.

21. A branch circuit monitoring system comprising:

a first current sensor module comprising:

a first current sensor operative to measure at least one power parameter of a first branch circuit line;

a first operating logic coupled with said first current sensor; and a first communication module operative to establish communications with an external device, said first communication module coupled with said first operating logic; and a second current sensor module comprising:

a second current sensor operative to measure at least one power parameter of a second branch circuit line;

a second operating logic coupled with said second current sensor; and a second communication module coupled with said second operating logic, wherein said first operating logic contains a unique identifier that is one of a port address representative of said first branch circuit line and a radio frequency identification chip number.

22. The branch circuit monitoring system of claim 21 wherein said second operating logic contains a unique identifier that is one of a port address representative of said second branch circuit line and a radio frequency identification chip number.

* * * * *